US012209597B2

(12) United States Patent
Bezzi

(10) Patent No.: US 12,209,597 B2
(45) Date of Patent: Jan. 28, 2025

(54) HYDRAULIC CIRCUIT INCLUDING A HYDRAULICALLY ACTUATABLE MOTION CONTROL VALVE

(71) Applicant: Dana Motion Systems Italia S.R.L., Reggio Emilia (IT)

(72) Inventor: Manuel Bezzi, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 0 days.

(21) Appl. No.: 18/476,168

(22) Filed: Sep. 27, 2023

(65) Prior Publication Data

US 2024/0102494 A1 Mar. 28, 2024

(30) Foreign Application Priority Data

Sep. 28, 2022 (DE) ..................... 20 2022 105 444.4

(51) Int. Cl.
*F15B 13/02* (2006.01)
*F15B 1/26* (2006.01)

(52) U.S. Cl.
CPC ............ *F15B 13/025* (2013.01); *F15B 1/265* (2013.01); *F15B 13/026* (2013.01); *F15B 13/027* (2013.01)

(58) Field of Classification Search
CPC .............. F15B 2211/355; F15B 13/042; F15B 13/0402; F15B 2013/0409; F15B 13/025
See application file for complete search history.

(56) References Cited

U.S. PATENT DOCUMENTS

2013/0269808 A1* 10/2013 Liukkunen .............. F15B 13/16 137/596.14
2019/0063469 A1* 2/2019 Otth .................... F15B 13/0435
2019/0257328 A1* 8/2019 Erikksson ............. F15B 20/008

* cited by examiner

*Primary Examiner* — Abiy Teka
(74) *Attorney, Agent, or Firm* — McCoy Russell LLP

(57) ABSTRACT

The present disclosure relates to a hydraulic circuit, comprising:
- a motion control valve including a valve spool and a hydraulic actuator for actuating the valve spool, and
- a hydraulic control device having an outlet fluidically connected to the hydraulic actuator, the hydraulic control device comprising a pressure-reducing valve or a pressure compensated flow control valve.

10 Claims, 8 Drawing Sheets

HYDRAULIC CIRCUIT INCLUDING A HYDRAULICALLY ACTUATABLE MOTION CONTROL VALVE

CROSS-REFERENCE TO RELATED APPLICATION

The present application claims priority to German Utility Model Application No. 20 2022 105 444.4, entitled “HYDRAULIC CIRCUIT INCLUDING A HYDRAULICALLY ACTUATABLE MOTION CONTROL VALVE”, and filed Sep. 28, 2022. The entire contents of the above-listed application is hereby incorporated by reference for all purposes.

TECHNICAL FIELD

The present disclosure relates to a hydraulic circuit including a hydraulically actuatable motion control valve. Hydraulic circuits including a hydraulically actuatable motion control valve may find application in the control of hydraulic loads such as hydraulic motors or hydraulic cylinders, for example.

BACKGROUND & SUMMARY

In many applications, a hydraulic load such as a hydraulic motor or a hydraulic cylinder may be controlled via a hydraulically actuatable motion control valve including a valve spool and a hydraulic actuator for actuating or switching the valve spool. For example, a pressure source such as a hydraulic pump may be fluidically connected to the hydraulic actuator of the motion control valve and to a high pressure port of the hydraulic load. The pressure source may then actuate or switch the valve spool of the motion control valve and drive the hydraulic load.

However, as the high pressure port of the hydraulic load is pressurized, an inertia of the hydraulic load typically creates a back pressure at the high pressure port of the hydraulic load which may act on the hydraulic actuator of the motion control valve. The performance of the motion control valve may therefore be influenced by or may depend on the hydraulic load, or on a pressure driving the hydraulic load. For example, when the hydraulic load includes a hydraulic motor driving a winch, the performance of the motion control valve may vary depending on a load acting on the winch. In many applications, this may be undesirable.

Thus, there is demand for a hydraulic circuit including a hydraulically actuatable motion control valve with a more uniform performance in different situations.

A hydraulic circuit including a hydraulically actuatable motion control valve which meets this demand are defined in the independent claims. Special embodiments are described in the dependent claims.

The presently proposed hydraulic circuit comprises:

- a motion control valve including a valve spool and a hydraulic actuator for actuating the valve spool, and
- a hydraulic control device having an outlet fluidically connected to the hydraulic actuator, the hydraulic control device comprising a pressure-reducing valve or a pressure compensated flow control valve.

The fact that the hydraulic control device comprises a pressure reducing-valve or a pressure compensated flow control valve fluidically connected to the hydraulic actuator of the motion control valve allows actuating or switching the spool of the motion control valve more uniformly in different situations. For example, it may allow a switching time required for the hydraulic actuator to switch the spool of the motion control valve between different positions to be largely independent of or less dependent on a hydraulic pressure at an inlet of the hydraulic control device.

The hydraulic actuator of the motion control valve may include a hydraulic chamber in fluid communication with an actuation surface of the valve spool of the motion control valve, for example.

The pressure-reducing valve may comprises an inlet, an outlet, a valve spool, and a biasing member. The valve spool of the pressure-reducing valve may be configured to continuously vary a variable cross section of a fluid connection between the inlet and the outlet of the pressure-reducing valve. The valve spool of the pressure-reducing valve may be configured to selectively fluidically isolate the inlet of the pressure-reducing valve from the outlet of the pressure-reducing valve, that is to selectively complete close the pressure-reducing valve. The biasing member of the pressure-reducing valve may bias the valve spool of the pressure-reducing valve towards increasing or maximizing the variable cross section of the fluid connection between the inlet and the outlet of the pressure-reducing valve. And the pressure-reducing valve may be configured such that a hydraulic pressure at the outlet of the pressure-reducing valve biases the valve spool of the pressure-reducing valve towards reducing or minimizing the variable cross section of the fluid connection between the inlet and the outlet of the pressure-reducing valve, against the bias of the biasing member of the pressure-reducing valve.

If or when the hydraulic control device comprises the pressure-reducing valve, the hydraulic circuit may further comprise a charging orifice, wherein an outlet of the pressure-reducing valve may be fluidically connected to the hydraulic actuator of the motion control valve via the charging orifice. The charging orifice may additionally reduce an influence of a hydraulic pressure at the inlet of the pressure control device on the functionality of the motion control valve.

The pressure compensated flow control valve may comprises an inlet, an outlet, an orifice, a valve spool, and a biasing member. The inlet of the pressure compensated flow control valve may be fluidically connectable to the outlet of the pressure compensated flow control valve via the orifice. The valve spool of the pressure compensated flow control valve may be configured to continuously vary a variable cross section of a fluid connection between the inlet and the outlet of the pressure compensated flow control valve. The valve spool of the pressure compensated flow control valve may be configured to selectively fluidically isolate the inlet of the pressure compensated flow control valve from the outlet of the pressure compensated flow control valve, that is to selectively completely close the pressure compensated flow control valve. The pressure compensated flow control valve may be configured such that a hydraulic pressure upstream of the orifice biases the valve spool of the pressure compensated flow control valve towards decreasing or minimizing the variable cross section of the fluid connection between the inlet and the outlet of the pressure compensated flow control valve. And the pressure compensated flow control valve may be configured such that the basing member of the pressure compensated flow control valve and a hydraulic pressure downstream of the orifice bias the valve spool of the pressure compensated flow control valve towards increasing or maximizing the variable cross section of the fluid connection between the inlet and the outlet of the pressure compensated flow control valve.

The motion control valve may be a proportional valve. Specifically, the valve spool of the motion control valve may be configured to continuously vary a minimum cross section between different fluid ports of the motion control valve.

The hydraulic circuit may further include a discharge check valve allowing fluid to discharge from the hydraulic actuator of the motion control valve to an inlet of the hydraulic control device through the discharge check valve. The discharge check valve may facilitate movement of the valve spool of the motion control valve.

The motion control valve may further include at least one biasing member for biasing the valve spool. The biasing member or one of the biasing members of the motion control valve may counteract or may be configured to counteract the hydraulic actuator of the motion control valve. For example, the biasing member of the motion control valve may bias the valve spool of the motion control valve to a desired position when a hydraulic pressure acting on the hydraulic actuator of the motion control valve is below a threshold pressure.

The hydraulic circuit may further comprise a hydraulic load such as a hydraulic motor or a hydraulic cylinder. An inlet of the hydraulic control device may then be fluidically connected or fluidically connectable to a first fluid port of the hydraulic load. The hydraulic actuator of the motion control valve may be configured to bias the valve spool of the motion control valve towards a discharge position in which the motion control valve fluidically connects a second fluid port of the hydraulic load to a discharge port of the motion control valve. In this manner, a hydraulic pressure at the first fluid port of the hydraulic load may allow fluid from the second fluid port of the hydraulic load to discharge via the motion control valve and may allow driving the hydraulic load.

The biasing member or one of the biasing members of the motion control valve may bias the valve spool of the motion control valve towards a closed position. In the closed position of the motion control valve, the motion control valve may fluidically isolate the second fluid port of the hydraulic load from the discharge port of the motion control valve. In this way, the motion control valve may assume a safety function. For instance, the motion control valve may block fluid flow through the hydraulic load and thereby disable the hydraulic load when a hydraulic pressure acting on the hydraulic actuator of the motion control valve and/or on the first fluid port of the hydraulic load is insufficient to actuate the hydraulic load. For example, when the hydraulic load includes a hydraulic motor for driving a winch, a biasing member of the motion control valve biasing the motion control valve to a closed position may lock the hydraulic motor when a hydraulic pressure at the first fluid port of the hydraulic motor is insufficient to counteract a load or weight acting on the winch.

In some embodiments, when the motion control valve is in the closed position, the motion control valve may fluidically connect the first fluid port of the hydraulic load to the second fluid port of the hydraulic load, for example in order to avoid or reduce cavitation in the hydraulic load.

The hydraulic circuit may further include a pressure source fluidically connected or fluidically connectable to the inlet of the hydraulic control device and to the first fluid port of the hydraulic load. For example, the pressure source may include a hydraulic pump or possibly a hydraulic cylinder.

The hydraulic circuit may further comprise a low pressure tank. The discharge port of the motion control valve may be fluidically connected or fluidically connectable to the low pressure tank. Additionally or alternatively, the discharge port of the motion control valve may be fluidically connected or fluidically connectable to a low pressure port of the pressure source, for example to a low pressure port of a hydraulic pump.

One presently proposed method of controlling a hydraulically actuatable motion control valve comprises pressurizing, via a pressure-reducing valve, a hydraulic actuator configured to actuate a valve spool of the motion control valve.

Another presently proposed method of controlling a hydraulically actuatable motion control valve comprises pressurizing, via a a pressure compensated flow control valve, a hydraulic actuator configured to actuate the valve spool of the motion control valve.

Embodiments of the presently proposed subject matter are illustrated in the accompanying drawing and are described in the following detailed description.

DETAILED DESCRIPTION

Figure 1:
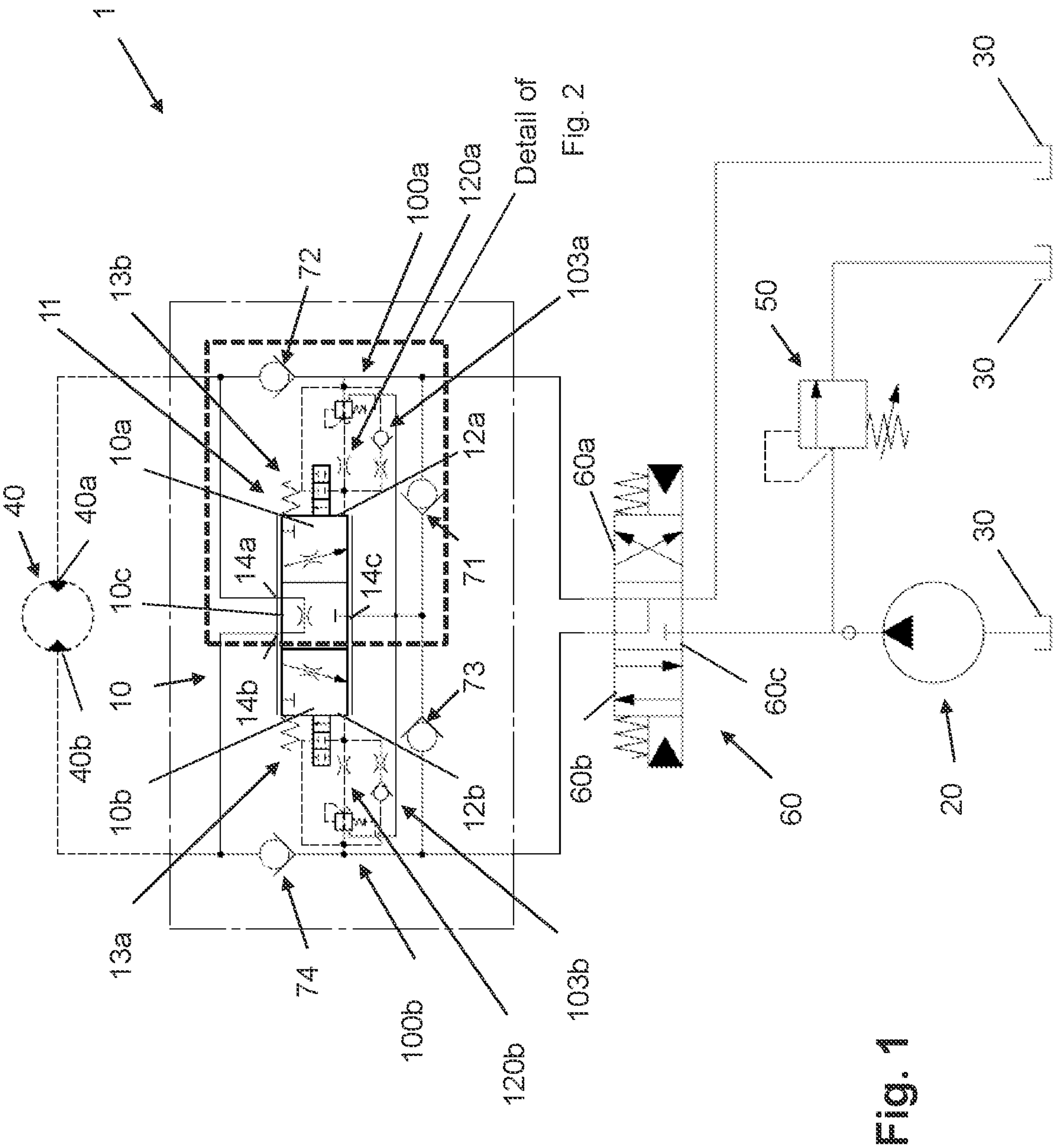
FIG. 1 schematically shows a hydraulic circuit including a hydraulically actuatable motion control valve and a hydraulic control device according to a first embodiment.
Figure 2:
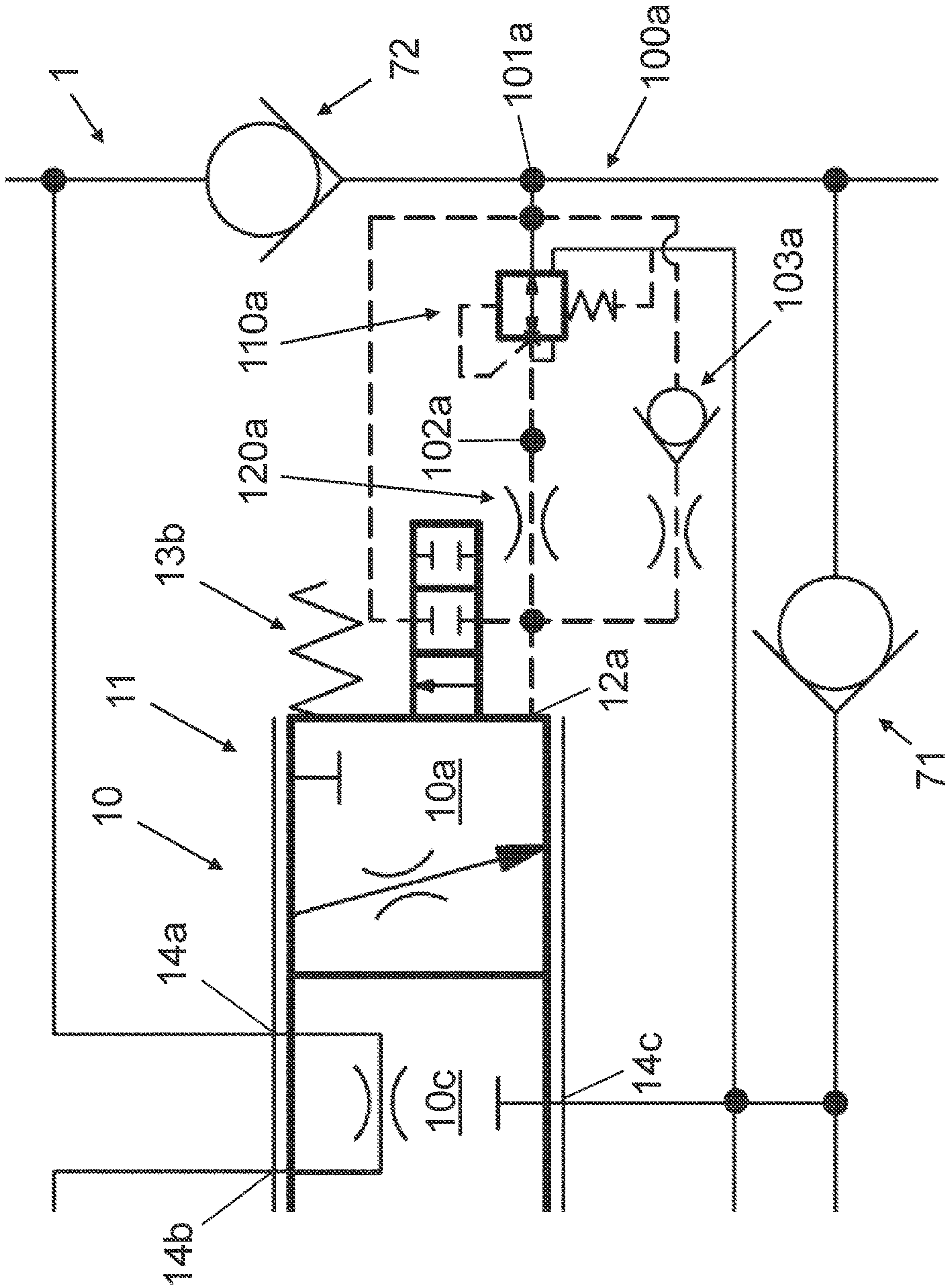
FIG. 2 shows a detail of FIG. 1.

FIG. 1 schematically shows a hydraulic circuit 1 of the presently proposed type according to a first embodiment. FIG. 2 shows a detail of FIG. 1. The figures are drawn using standard hydraulic symbols to represent various components. Here and in all of the following, features recurring in different figures are designated with the same reference signs. The hydraulic circuit 1 comprises a hydraulic load 40, a pressure source 20 for driving the hydraulic load 40, and a motion control valve 10. As will be explained in more detail below, the motion control valve 10 may control operation of the hydraulic load 40. More specifically, the motion control valve 10 may assume a safety function in the operation of the hydraulic load 40.

The pressure source 20 may include or may be configured as a hydraulic pump. However, in alternative embodiments the pressure source 20 may include other sources of hydraulic pressure such as a hydraulic cylinder, for example. The hydraulic load 40 may include a hydraulic actuator such as a hydraulic motor or a hydraulic cylinder, for example. For instance, the hydraulic load 40 may include a hydraulic motor of a hydrostatic transmission, a hydraulic motor for driving a winch, or a hydraulic cylinder for driving a lifting device. However, it is understood that the hydraulic load 40 may include other types of hydraulic actuators known in the art of hydraulics and is not restricted to the aforementioned applications.

In the embodiment shown in FIG. 1, the hydraulic circuit 1 further comprises a low pressure tank 30, a directional valve 60 allowing the pressure source 20 to selectively drive the hydraulic load 40 in different directions, and a relief valve 50 fluidically connected to the low pressure tank 30 and configured to limited a pressure supplied to the hydraulic load 40. A hydraulic pressure in the low pressure tank 30 may be at atmospheric pressure, for example. Here, a low pressure port of the pressure source 20 and a low pressure port of the hydraulic load 40 are fluidically connected or fluidically connectable to the low pressure tank 30. It is understood that alternative embodiments of the hydraulic circuit 1 may not include or may not include all of the low pressure tank 30, the directional valve 60 or the relief valve 50.

In the embodiment depicted in FIG. 1, the motion control valve 10 is configured as a 3/3 proportional valve having three fluid ports 14*a*, 14*b*, 14*c* and a valve spool 11 which may be moved or switched continuously between three control positions 10*a*, 10*b*, 10*c*. Further, in the embodiment depicted in FIG. 1, the motion control valve 10 has two hydraulic actuators 12*a*, 12*b* for actuating or moving the valve spool 11, and two biasing members or biasing springs 13*a*, 13*b*. The motion control valve 10 selectively fluidically connects the fluid ports 40*a*, 40*b* of the hydraulic load 40 to the discharge port 14*c* of the motion control valve 40. Here, the discharge port 14*c* of the motion control valve 10 is fluidically connected or fluidically connectable to the low pressure tank 30, for example via the directional valve 60.

The fluid ports 40*a*, 40*b* of the hydraulic load 40 are fluidically connected to the fluid ports 14*a*, 14*b* of the motion control valve 10, respectively. When the motion control valve 10 is in the closed position 10*c*, as shown in FIG. 1, the fluid ports 40*a*, 40*b* of the hydraulic load 40 are fluidically isolated from the discharge port 14*c* of the motion control valve 10. In the closed position 10*c*, the motion control valve 10 may fluidically connect the fluid ports 40*a*, 40*b* of the hydraulic load 40 such as via an orifice as shown in FIG. 1, for example in order to avoid cavitation in the hydraulic load 40. By contrast, when the motion control valve 10 is in the first discharge position 10*a*, the motion control valve 10 fluidically connects the fluid port 40*b* of the hydraulic load 40 to the discharge port 14*c* and fluidically isolates the fluid port 40*a* from the discharge port 14*c*, and when the motion control valve 10 is in the second discharge position 10*b*, the motion control valve 10 fluidically connects the fluid port 40*a* of the hydraulic load 40 to the discharge port 14*c* and fluidically isolates the fluid port 40*b* from the discharge port 14*c*.

When no hydraulic pressure is applied to the hydraulic actuators 12*a*, 12*b* of the motion control valve 10, the biasing members or biasing springs 13*a*, 13*b* of the motion control valve 10 bias the valve spool 11 of the motion control valve 10 to its closed position 10*c*. Or in other words, in the embodiment shown in FIG. 1 the motion control valve 10 is configured as a normally closed valve. More specifically, the first biasing member or biasing spring 13*a* biases the valve spool 11 of the motion control valve 10 from its first discharge position 10*a* towards the closed position 10*c*, and the second biasing member or biasing spring 13*b* biases the valve spool 11 of the motion control valve 10 from its second discharge position 10*b* towards the closed position 10*c*.

The first hydraulic actuator 12*a* of the motion control valve 10 is configured to bias the valve spool 11 of the motion control valve 10 towards the first discharge position 10*a*. That is, when pressurized, for example when pressurized above a threshold pressure, the first hydraulic actuator 12*a* actuates or switches the valve spool 11 of the motion control valve 10 from the closed position 10*c* towards the first discharge position 10*a*, against the bias of the first biasing member or biasing spring 13*a*. And the second hydraulic actuator 12*b* of the motion control valve 10 is configured to bias the valve spool 11 of the motion control valve 10 towards the second discharge position 10*b*. That is, when pressurized, for example when pressurized above a threshold pressure, the second hydraulic actuator 12*b* actuates or switches the valve spool 11 of the motion control valve 10 from the closed position 10*c* towards the second discharge position 10*b*, against the bias of the second biasing member or biasing spring 13*b*. The hydraulic actuators 12*a*, 12*b* may be configured as pressure chambers in fluidic communication with corresponding actuation surfaces of the valve spool 11 of the motion control valve 10, as is generally known in the art of hydraulic devices. As the first biasing member or biasing spring 13*a* moves the spool 11 of the motion control valve 10 from its first discharge position 10*a* towards its closed position 10*c*, fluid from the first hydraulic actuator 12*a* may discharge via a first discharge check valve 103*a*. Similarly, as the second biasing member or biasing spring 13*b* moves the spool 11 of the motion control valve 10 from its second discharge position 10*b* towards its closed position 10*c*, fluid from the second hydraulic actuator 12*b* may discharge via a second discharge check valve 103*b*.

As can be observed in FIG. 1, the directional valve 60 may be selectively switched to one of three control positions 60*a*, 60*b*, 60*c*. For instance, the directional valve 60 may be a solenoid-actuated valve pre-biased to the closed position 60*c*. When the directional valve 60 is in the closed position 60*c*, as shown in FIG. 1, the directional valve 60 fluidically isolates the pressure source 20 from the motion control valve 10 and from the hydraulic load 40, and fluidically connects the discharge port 14*c* of the motion control valve 10 to the low pressure tank 30, here via check valves 71, 73.

When the directional valve 60 is in its first actuation position 60*a*, the directional valve 60 fluidically connects a high pressure port of the pressure source 20 to the first hydraulic actuator 12*a* of the motion control valve 10 and to the fluid port 40*a* of the hydraulic load, here through a check valve 72, and fluidically connects the discharge port 14*c* of the motion control valve 10 to the low pressure tank 30, here via the check valve 73. That is, when the directional valve 60 is in its first actuation position 60*a*, the pressure source 20 may pressurize the first hydraulic actuator 12*a* of the motion control valve 10 to move or switch the valve spool 11 of the motion control valve 10 towards its first discharge position 10*a*. Simultaneously, the pressure source 20 may pressurize the fluid port 40*a* of the hydraulic load 40 to actuate the hydraulic load 40.

As the pressure source 20 starts pressurizing the first hydraulic actuator 12*a* of the motion control valve 40 and the fluid port 40*a* of the hydraulic load 40, the valve spool 11 of the proportional motion control valve 10 moves towards its first discharge position 10*a*, the motion control valve 40 thereby gradually fluidically connecting the fluid port 40*b* of the hydraulic load 40 to the discharge port 14*c* of the motion control valve 10 and to the low pressure tank 30. In this way, the pressure source 20 may pump fluid to the fluid port 40*a* of the hydraulic load 40, through the hydraulic load 40, and from the fluid port 40*b* of the hydraulic load 40 through the motion control valve 10, the check valve 73, and the directional valve 60 to the low pressure tank 30. In this configuration, that is as the directional valve 60 is in its first actuation position 60*a* and the pressure source 20 pressurizes the first hydraulic actuator 12*a* of the motion control valve 10 and the fluid port 40*a* of the hydraulic load 40, the check valve 71 fluidically isolates the pressure source 20 from the discharge port 14*c* of the motion control valve 10, and a check valve 74 prevents fluid flowing from the fluid port 40*b* of the hydraulic load 40 from bypassing the motion control valve 10.

Similarly, when the directional valve 60 is in its second actuation position 60*b*, the directional valve 60 fluidically connects the high pressure port of the pressure source 20 to the second hydraulic actuator 12*b* of the motion control valve 10 and to the fluid port 40*b* of the hydraulic load, here through the check valve 74, and fluidically connects the discharge port 14*c* of the motion control valve 10 to the low pressure tank 30, here via the check valve 71. That is, when the directional valve 60 is in its second actuation position 60*b*, the pressure source 20 may pressurize the second hydraulic actuator 12*b* of the motion control valve 10 to move or switch the valve spool 11 of the motion control valve 10 towards its second discharge position 10*b*. Simultaneously, the pressure source 20 may pressurize the fluid port 40*b* of the hydraulic load 40 to actuate the hydraulic load 40.

As the pressure source 20 starts pressurizing the second hydraulic actuator 12*b* of the motion control valve 40 and the fluid port 40*b* of the hydraulic load 40, the valve spool 11 of the proportional motion control valve 10 moves towards its second discharge position 10*b*, the motion control valve 40 thereby gradually fluidically connecting the fluid port 40*a* of the hydraulic load 40 to the discharge port 14*c* of the motion control valve 10 and to the low pressure tank 30. In this way, the pressure source 20 may pump fluid to the fluid port 40*b* of the hydraulic load 40, through the hydraulic load 40, and from the fluid port 40*a* of the hydraulic load 40 through the motion control valve 10, the check valve 71, and the directional valve 60 to the low pressure tank 30. In this configuration, that is as the directional valve 60 is in its second actuation position 60*b* and the pressure source 20 pressurizes the second hydraulic actuator 12*b* of the motion control valve 10 and the fluid port 40*b* of the hydraulic load 40, the check valve 73 fluidically isolates the pressure source 20 from the discharge port 14*c* of the motion control valve 10, and the check valve 72 prevents fluid flowing from the fluid port 40*a* of the hydraulic load 40 from bypassing the motion control valve 10.

From the above description of the hydraulic circuit 1 of FIG. 1, it is apparent that the hydraulically actuatable motion control valve 10 assumes or may assume a safety function in the operation of the hydraulic load 40. For instance, the motion control valve 10 may guarantee that a fluid flow through the hydraulic load 40 is prevented as long as or once a hydraulic pressure supplied to hydraulic load 40 is not sufficient to control actuation of the hydraulic load 40. For example, when the hydraulic load 40 includes a hydraulic motor for driving a winch, the motion control valve 10 may guarantee that the winch may not be activated unless the pressure source 20 supplies sufficient hydraulic pressure to overcome a load or weight acting on the winch.

One disadvantage of hydraulic circuits known from the prior art is that the time needed to move or switch the spool 11 of the hydraulically actuatable motion control valve 10 may vary with varying pressure levels supplied by the pressure source 20 or with varying backpressures created by the hydraulic load 40, for example.

In order to mitigate this effect, the hydraulic circuit 1 includes a first hydraulic control device 100*a* and a second hydraulic control device 100*b*. An inlet 101*a* of the first hydraulic control device 100*a* is fluidically connected or fluidically connectable to the high pressure port of the pressure source 20 and to the fluid port 40*a* of the hydraulic load 40. An outlet 102*a* of the first hydraulic control device 100*a* is fluidically connected to the first hydraulic actuator 12*a* of the motion control valve 10 so that the first hydraulic actuator 12*a* is configured to be pressurized via the first hydraulic control device 100*a*. Analogously, an inlet of the second hydraulic control device 100*b* is fluidically connected or fluidically connectable to the high pressure port of the pressure source 20 and to the fluid port 40*b* of the hydraulic load 40. And an outlet of the second hydraulic control device 100*b* is fluidically connected to the second hydraulic actuator 12*b* of the motion control valve 10 so that the second hydraulic actuator 12*b* is configured to be pressurized via the second hydraulic control device 100*b*. The hydraulic control devices 100*a*, 100*b* are designed to reduce the influence of pressure variations at the inlets of the hydraulic control devices 100*a*, 100*b* on the performance of the motion control valve 10. More specifically, The hydraulic control devices 100*a*, 100*b* are designed to reduce the influence of pressure variations at the inlets of the hydraulic control devices 100*a*, 100*b* on the time it takes the hydraulic actuators 12*a*, 12*b* to switch the spool 11 of the motion control valve 10 from its closed position 10*c* to its discharge positions 10*a*, 10*b*, respectively. In the embodiment depicted in FIG. 1, the hydraulic control devices 100*a*, 100*b* are identical in design. Further details of the first hydraulic control device 100*a* of the hydraulic circuit 1 of FIG. 1 are illustrated in FIGS. 2 and 3.

In the embodiment of FIG. 1, the first hydraulic control device 100*a* includes a first pressure-reducing valve 110*a*. Pressure-reducing valves are generally known in the art of hydraulics and are designed to produce a constant or essentially constant outlet pressure even under varying inlet pressures. Typically, a pressure-reducing valve is configured to produce a constant or essentially constant outlet pressure when an inlet pressure of the pressure-reducing valve is equal to or above a predetermined threshold pressure. The hydraulic circuit 1 of FIG. 1 further includes a first charging orifice 120*a* fluidically disposed in between the first pressure-reducing valve 110*a* and the first hydraulic actuator 12*a*, and a second charging orifice 120*b* fluidically disposed in between a second pressure-reducing valve of the second hydraulic control device 100*b* and the second hydraulic actuator 12*b*.

Figure 3:
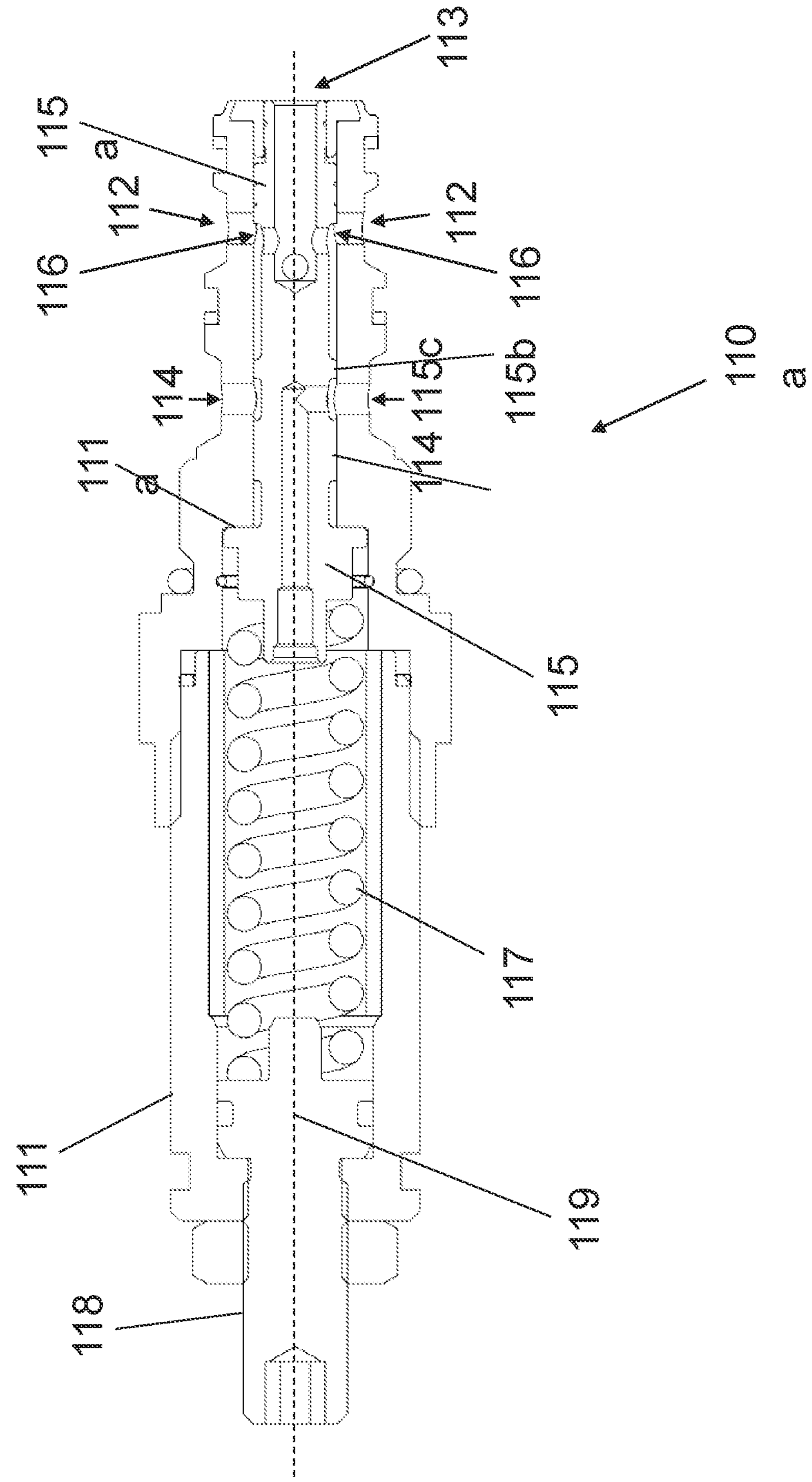
FIG. 3 schematically shows an embodiment of a pressure-reducing valve included in the hydraulic circuit of FIGS. 1 and 2.

One possible embodiment of the first pressure-reducing valve 110*a* of the first hydraulic control device 100*a* of FIGS. 1 and 2 is illustrated in FIG. 3. While drawn to scale in FIG. 3, it is understood that the design of the pressure-reducing valve 110*a* may differ from the design explicitly described herein.

The first pressure-reducing valve 110*a* includes a hollow valve body 111 extending along a valve axis 119, inlet openings 112 and equalization openings 114, both configured as bores extending through the valve body 111 perpendicular to the valve axis 119 and axially spaced from one another, an outlet opening 113 at an axial end of the valve body 111, an axially movable valve spool 115 disposed within the hollow valve body 111 and having lands 115*a*, 115*b*, 115*c* which are axially spaced from one another, and a biasing member 117 such as a biasing spring exerting a biasing force on the valve spool 115. Fluid may flow from the inlet openings 112 to the outlet opening 113 via a fluid connection partially extending through the valve spool 115. A variable cross section 116 of said fluid connection between the inlet openings 112 and the outlet opening 113 is defined by the inlet openings 112 and by a land 115*a* of the valve spool 115. Further, the pressure-reducing valve 110*a* includes an adjustment device 118 such as an adjustment screw for adjusting the biasing force which the biasing member 117 exerts on the valve spool 115. The biasing member 117 is axially supported on the valve body 111, here via the adjustment device 118, and biases the valve spool 115 towards the outlet opening 113 along the valve axis 119. A seat 111*a* formed by the valve body 111 limits axial movement of the valve spool 115 towards the outlet opening 113. The inlet openings 112 of the first pressure-reducing valve 110*a* constitute the inlet 101*a* of the first hydraulic control device 100*a*, and the outlet opening 113 of the first pressure-reducing valve 110*a* constitutes the outlet 102*a* of the first hydraulic control device 100*a*.

The pressure-reducing valve 110*a* is designed such that when a hydraulic pressure at the outlet opening 113 is at a target pressure, a force exerted on the valve spool 115 by the hydraulic pressure at the outlet opening 113 and biasing the valve spool 115 away from the outlet opening 113 along the axis 119 on one hand and a biasing force exerted on the valve spool 115 by the biasing member 117 and biasing the valve spool 115 towards the outlet opening 113 along the axis 119 on the other hand match each other and the valve spool 115 takes on an equilibrium axial position. The target pressure may be set by changing or adjusting an axial position of the adjustment device 118 with respect to the valve body 111.

When the hydraulic pressure at the outlet opening 113 exceeds the target pressure, for example due to an increase in hydraulic pressure at the inlet openings 112, the corresponding increased hydraulic pressure at the outlet opening 113 axially moves the valve spool 115 away from the outlet opening 113, against the bias of the biasing member 117, thereby causing the land 115*a* of the valve spool 115 to reduce the variable cross section 116 defined by the inlet openings 112 and the land 115*a*. Consequently, a fluid flow through the variable cross section 116 from the inlet openings 112 toward the outlet opening 113 and the hydraulic pressure at the outlet opening 113 are reduced, until the valve spool 115 reaches a new equilibrium axial position. And when the hydraulic pressure at the outlet opening 113 falls below the target pressure, for example due to a decrease in hydraulic pressure at the inlet openings 112, the the biasing member 117 axially moves the valve spool 115 toward the outlet opening 113, thereby causing the land 115*a* of the valve spool 115 to increase the variable cross section 116 defined by the inlet openings 112 and the land 115*a*. Consequently, a fluid flow through the variable cross section 116 from the inlet openings 112 toward the outlet opening 113 and the hydraulic pressure at the outlet opening 113 increase, until the valve spool 115 reaches a new equilibrium axial position.

A volume within the hollow valve body 111 which houses the biasing member 117 is in fluid communication with the equalization openings 114 so that when the valve spool 115 moves along the valve axis 119, a hydraulic pressure within said volume may equalize via the equalization openings 114. In the embodiment depicted in FIGS. 1-3, the equalization openings 114 of the first pressure-reducing valve 110*a* are fluidically connected to the discharge port 14*c* of the motion control valve 10, for example.

During normal operation, the land 115*b* of the valve spool 115 fluidically isolates the inlet openings 112 and the outlet opening 113 from the equalization openings 114, and the land 115*c* of the valve spool 115 fluidically isolates the equalization openings 114 from the volume housing the biasing member 117. However, as a pressure at the outlet opening 113 exceeds a threshold pressure and the land 115*b* is moved past the equalization openings 114 along the valve axis 119 and away from the outlet opening 113, the outlet opening 113 is placed in fluidic communication with the equalization openings 114 and high pressure fluid at the outlet opening 113 may discharge via the equalization openings 114.

Figure 4:
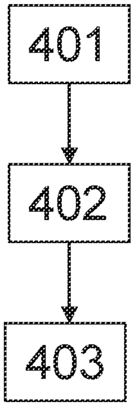
FIG. 4 schematically shows steps of a method of controlling the hydraulically actuatable motion control valve of FIGS. 1 and 2.

FIG. 4 schematically illustrates steps of a method of controlling the hydraulically actuatable motion control valve 10 of FIGS. 1 and 2. At 401, the pressure source 20 pressurizes the hydraulic actuator 12*a* of the motion control valve 10 via the pressure-reducing valve 110*a*. At 402, the hydraulic actuator 12*a* moves the valve spool 11 of the motion control valve 10 towards its first discharge position 10*a* in which the motion control valve 10 fluidically connects the fluid port 40*b* of the hydraulic load 40 to the low pressure tank 30. And at 403 the pressure source 20 additionally pressurizes the fluid port 40*a* of the hydraulic load 40 and drives the hydraulic load 40.

Figure 5:
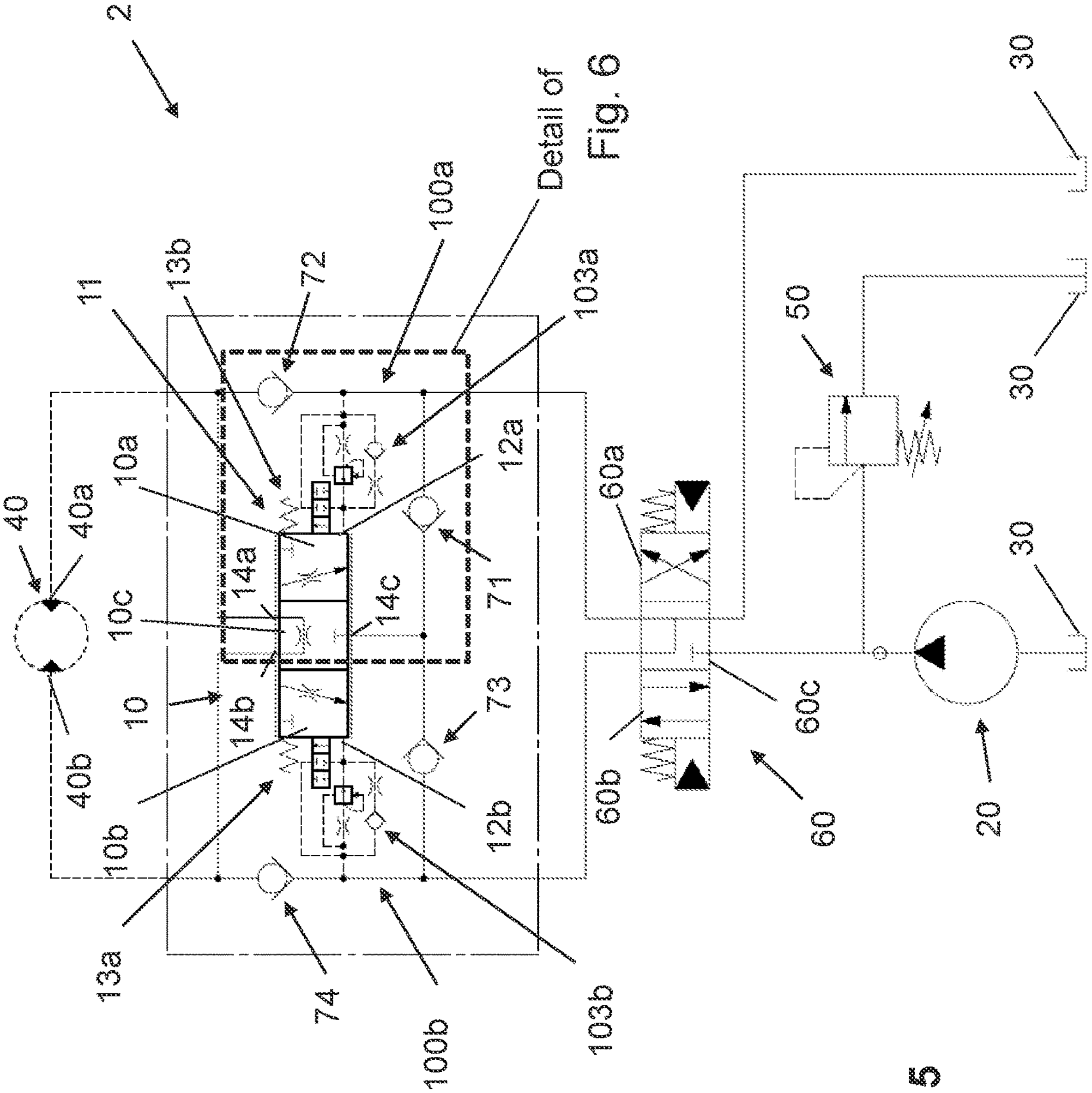
FIG. 5 schematically shows a hydraulic circuit including a hydraulically actuatable motion control valve and a hydraulic control device according to a second embodiment.
Figure 6:
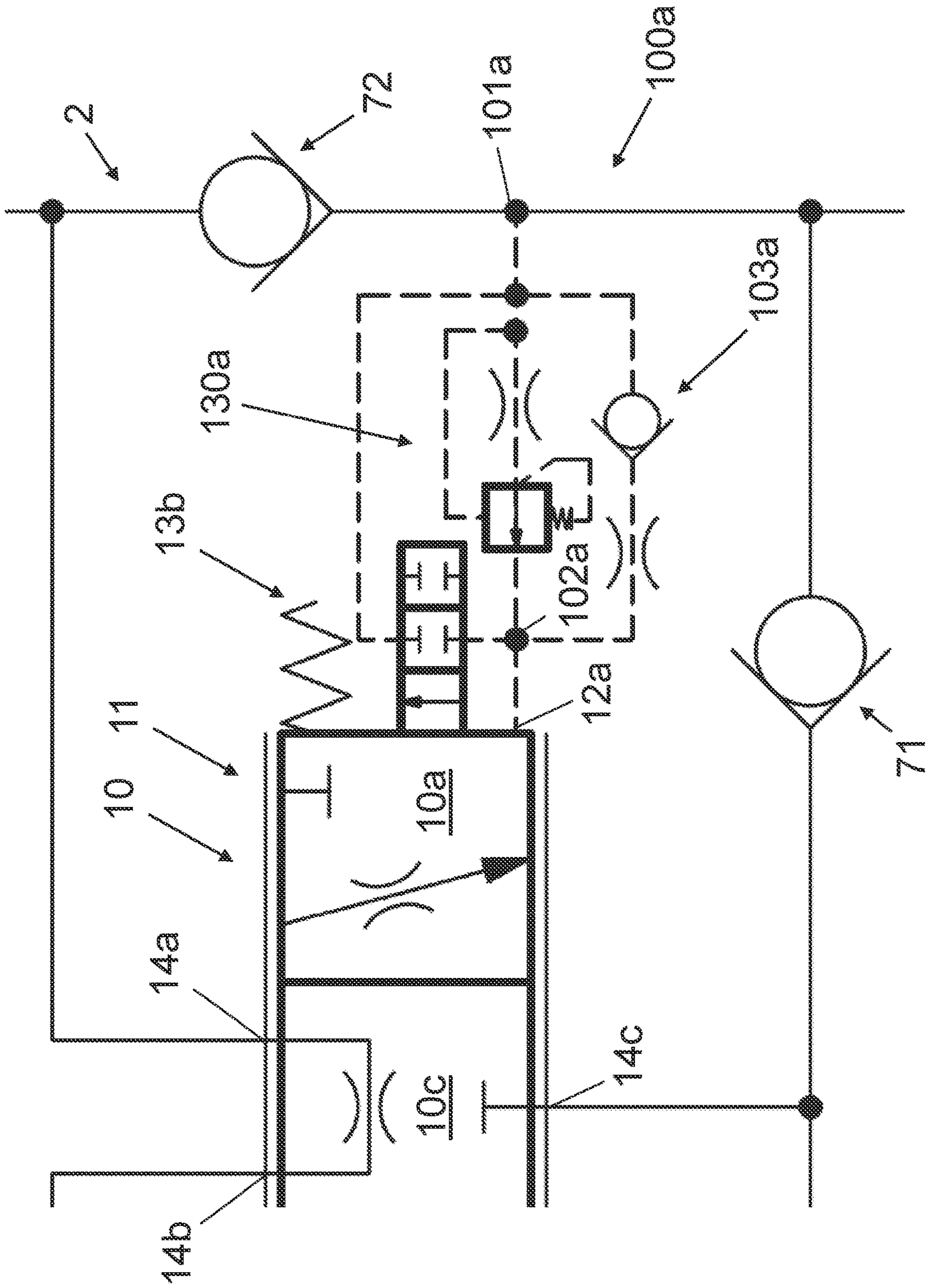
FIG. 6 shows a detail of FIG. 5.

FIG. 5 schematically shows a hydraulic circuit 2 of the presently proposed type according to a second embodiment. FIG. 6 shows a detail of FIG. 5, again where both figures utilize standardized hydraulic symbols. As before, features recurring in different figures are designated with the same reference signs. The hydraulic circuit 2 of FIGS. 5 and 6 is a variant of the hydraulic circuit 1 of FIGS. 1 and 2. Like the hydraulic circuit 1 of FIGS. 1 and 2, the hydraulic circuit 2 of FIGS. 5 and 6 comprises a hydraulic load 40, a pressure source 20 for driving the hydraulic load 40, and a motion control valve 10. Unless explicitly stated to the contrary, the elements of the hydraulic circuit 2 of FIGS. 5 and 6 are identical to the correspondingly designated elements of the hydraulic circuit 1 of FIGS. 1 and 2 and have the same functionality. Thus, for the sake of brevity and simplicity, in the following only those features of the hydraulic circuit 2 of FIGS. 5 and 6 which distinguish the hydraulic circuit 2 of FIGS. 5 and 6 from the hydraulic circuit 1 of FIGS. 1 and 2 are described in some detail.

The hydraulic circuit 2 of FIGS. 5 and 6 differs from the hydraulic circuit 1 of FIGS. 1 and 2 in that in the hydraulic circuit 2 of FIGS. 5 and 6 the hydraulic control devices 100*a*, 100*b* each include a pressure compensated flow control valve. Pressure compensated flow control valves are generally known in the art of hydraulics and are designed to produce a constant or essentially constant outlet flow even under varying inlet pressures. Again, in the embodiment depicted in FIG. 5, the hydraulic control devices 100*a*, 100*b* are identical in design. Further details of the first hydraulic control device 100*a* of the hydraulic circuit 2 of FIG. 5 are illustrated in FIGS. 6 and 7.

Figure 7:
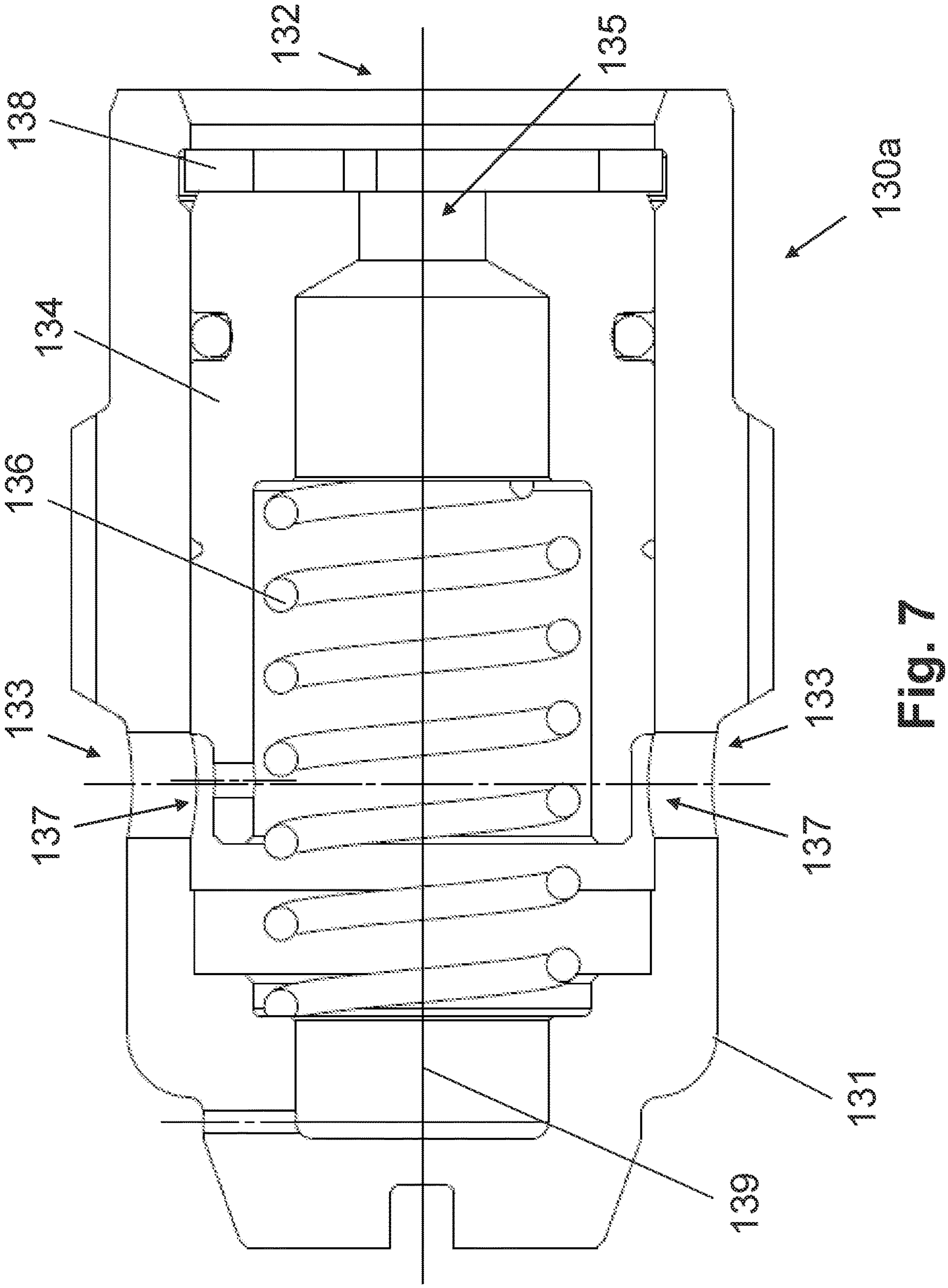
FIG. 7 schematically shows an embodiment of a pressure compensated flow control valve included in the hydraulic circuit of FIGS. 5 and 6.

One possible embodiment of the first pressure compensated flow control valve 130*a* of the first hydraulic control device 100*a* of FIGS. 5 and 6 is illustrated in FIG. 7. While FIG. 7 is drawn to scale, it is understood that the design of the first pressure compensated flow control valve 130*a* may differ from the design explicitly described herein.

The first pressure compensated flow control valve 130*a* includes a hollow valve body 131 extending along a valve axis 139, an inlet opening 132 at an axial end of the valve body 131, outlet openings 133 configured as bores extending through the valve body 131 perpendicular to the valve axis 139, an axially movable valve spool 134 disposed within the hollow valve body 131, an orifice 135, and a biasing member 136 such as a biasing spring exerting a biasing force on the valve spool 134. The inlet opening 132 of the first pressure compensated flow control valve 130*a* constitutes the inlet 101*a* of the first hydraulic control device 100*a*, and the outlet openings 133 of the first pressure compensated flow control valve 130*a* constitute the outlet 102*a* of the first hydraulic control device 100*a*. The inlet opening 132 is fluidically connected or fluidically connectable to the outlet openings 133 via the orifice 135. Here, the orifice 135 is formed within the axially movable valve spool 134. It is understood that in alternative embodiments the orifice 135 may be formed within or may be fixed relative to the valve body 131, for example.

Fluid may flow from the inlet opening 132 to the outlet openings 133 via a fluid connection partially extending through the valve spool 134. A variable cross section 137 of said fluid connection between the inlet opening 132 and the outlet openings 133 is defined by the outlet openings 133 and by a portion of the valve spool 134 configured to partially or fully close the outlet openings 133. The biasing member 136 is axially supported on the valve body 131 and biases the valve spool 134 towards the inlet opening 132 along the valve axis 139. A mechanical stop 138 such as a perforated plate or ring fixed to the valve body 131 limits axial movement of the valve spool 134 towards the inlet opening 132.

The first pressure compensated flow control valve 130*a* is configured such that a hydraulic pressure upstream of the orifice 135, for example between the inlet opening 132 and the orifice 135, biases the valve spool 134 towards decreasing or minimizing the variable cross section 137. By contrast, the basing member 136 and a hydraulic pressure downstream of the orifice 135, for example between the outlet openings 133 and the orifice 135, bias the valve spool 134 towards increasing or maximizing the variable cross section 137.

The pressure compensated flow control valve 130*a* is designed such that when a fluid flow from the inlet opening 132 to the outlet openings 133 is at a target flow rate, a force exerted on the valve spool 134 by the hydraulic pressure downstream of the orifice 135 and and by the biasing member 136 and biasing the valve spool 134 towards the inlet opening 132 along the axis 139 on one hand and a force exerted on the valve spool 134 by the hydraulic pressure upstream of the orifice 135 and biasing the valve spool 134 away from the inlet opening 132 along the axis 119 on the other hand match each other and the valve spool 134 takes on an equilibrium axial position. In other embodiments not explicitly depicted here, the target flow rate may be set by adjusting a cross section of the orifice 135 and/or by adjusting a biasing force the biasing member 136 exerts on the valve spool 134.

When the fluid flow from the inlet opening 132 to the outlet openings 133 exceeds the target flow rate, for example due to an increase in hydraulic pressure at the inlet opening 132, the increased hydraulic pressure at the inlet opening 132 axially moves the valve spool 134 away from the inlet opening 132, against the bias of the biasing member 136, and causes the valve spool 134 to reduce the variable cross section 137. The reduction in the variable cross section 137 reduces the flow rate between the inlet opening 132 and the outlet openings 133, until the fluid flow reaches the target flow rate and the valve spool 134 reaches a new equilibrium axial position.

And when the fluid flow from the inlet opening 132 to the outlet openings 133 falls below the target flow rate, for example due to a decrease in hydraulic pressure at the inlet opening 132, the biasing member 136 axially moves the valve spool 134 toward the inlet opening 132, thereby increasing the variable cross section 137. The increase in the variable cross section 137 increases the flow rate between the inlet opening 132 and the outlet openings 133, until the fluid flow reaches the target flow rate and the valve spool 134 reaches another equilibrium axial position.

Figure 8:
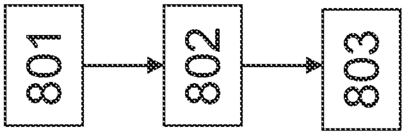
FIG. 8 schematically shows steps of a method of controlling the hydraulically actuatable motion control valve of FIGS. 5 and 6.

FIG. 8 schematically illustrates steps of a method of controlling the hydraulically actuatable motion control valve 10 of FIGS. 5 and 6. At 801, the pressure source 20 pressurizes the hydraulic actuator 12*a* of the motion control valve 10 via the pressure compensated flow control valve 130*a*. At 802, the hydraulic actuator 12*a* moves the valve spool 11 of the motion control valve 10 towards its first discharge position 10*a* in which the motion control valve 10 fluidically connects the fluid port 40*b* of the hydraulic load 40 to the low pressure tank 30. And at 803 the pressure source 20 additionally pressurizes the fluid port 40*a* of the hydraulic load 40 and drives the hydraulic load 40.

The invention claimed is:

1. A hydraulic circuit, comprising:

a motion control valve including a valve spool and a hydraulic actuator for actuating the valve spool, a hydraulic control device having an outlet fluidically connected to the hydraulic actuator, the hydraulic control device comprising a pressure-reducing valve or a pressure compensated flow control valve, and a discharge check valve allowing fluid to discharge from the hydraulic actuator to an inlet of the hydraulic control device through the discharge check valve.

2. The hydraulic circuit of claim 1, wherein the pressure-reducing valve comprises an inlet, an outlet, a valve spool, and a biasing member, wherein the valve spool of the pressure-reducing valve is configured to continuously vary a variable cross section of a fluid connection between the inlet and the outlet of the pressure-reducing valve, wherein the biasing member of the pressure-reducing valve biases the valve spool of the pressure-reducing valve towards increasing or maximizing the variable cross section of the fluid connection between the inlet and the outlet of the pressure-reducing valve, and wherein a hydraulic pressure at the outlet of the pressure-reducing valve biases the valve spool of the pressure-reducing valve towards reducing or minimizing the variable cross section of the fluid connection between the inlet and the outlet of the pressure-reducing valve.

3. The hydraulic circuit of claim 1, wherein the hydraulic control device comprises a pressure-reducing valve and the hydraulic circuit further comprises a charging orifice, and wherein an outlet of the pressure-reducing valve is fluidically connected to the hydraulic actuator of the motion control valve via the charging orifice.

4. The hydraulic circuit of claim 1, wherein the motion control valve is a proportional valve.

5. The hydraulic circuit of claim 1, wherein the motion control valve further includes a biasing member for biasing the valve spool of the motion control valve, the biasing member counteracting or configured to counteract the hydraulic actuator of the motion control valve.

6. The hydraulic circuit of claim 1, further comprising a hydraulic load, wherein an inlet of the hydraulic control device is fluidically connected or fluidly connectable to a first fluid port of the hydraulic load, and wherein the hydraulic actuator of the motion control valve is configured to bias the valve spool of the motion control valve towards a discharge position in which the motion control valve fluidly connects a second fluid port of the hydraulic load to a discharge port of the motion control valve.

7. The hydraulic circuit of claim 6, wherein a biasing member of the motion control valve biases the valve spool of the motion control valve towards a closed position in which the motion control valve fluidly isolates the second fluid port of the hydraulic load from the discharge port of the motion control valve.

8. The hydraulic circuit of claim 6, further comprising a low pressure tank, wherein the discharge port of the motion control valve is fluidically connected or fluidly connectable to the low pressure tank.

9. The hydraulic circuit of claim 6, further including a pressure source fluidically connected or fluidly connectable to the inlet of the hydraulic control device and to the first fluid port of the hydraulic load.

10. A hydraulic circuit, comprising:

a motion control valve including a valve spool and a hydraulic actuator for actuating the valve spool, and a hydraulic control device having an outlet fluidically connected to the hydraulic actuator, the hydraulic control device comprising a pressure-reducing valve or a pressure compensated flow control valve, wherein the pressure compensated flow control valve comprises an inlet, an outlet, an orifice, a valve spool, and a biasing member, wherein the inlet of the pressure compensated flow control valve is fluidly connectable to the outlet of the pressure compensated flow control valve via the orifice, wherein the valve spool of the pressure compensated flow control valve is configured to continuously vary a variable cross section of a fluid connection between the inlet and the outlet of the pressure compensated flow control valve, wherein a hydraulic pressure upstream of the orifice biases the valve spool of the pressure compensated flow control valve towards reducing or minimizing the variable cross section of the fluid connection between the inlet and the outlet of the pressure compensated flow control valve, and wherein the basing member of the pressure compensated flow control valve and a hydraulic pressure downstream of the orifice bias the valve spool of the pressure compensated flow control valve towards increasing or maximizing the variable cross section of the fluid connection between the inlet and the outlet of the pressure compensated flow control valve.

* * * * *